(12) United States Patent
Perez et al.

(10) Patent No.: US 9,869,419 B2
(45) Date of Patent: Jan. 16, 2018

(54) CONTROLLER, METHOD OF OPERATING A WATER SOURCE HEAT PUMP AND A WATER SOURCE HEAT PUMP

(71) Applicant: Lennox Industries Inc., Richardson, TX (US)

(72) Inventors: Eric Perez, Hickory Creek, TX (US); Steve Schneider, Plano, TX (US); Harold Gene Havard, Jr., Carrollton, TX (US)

(73) Assignee: Lennox Industries Inc., Richardson, TX (US)

( * ) Notice: Subject to any disclaimer, the term of this patent is extended or adjusted under 35 U.S.C. 154(b) by 53 days.

(21) Appl. No.: 15/162,813

(22) Filed: May 24, 2016

(65) Prior Publication Data

US 2016/0265707 A1    Sep. 15, 2016

Related U.S. Application Data

(63) Continuation of application No. 13/627,438, filed on Sep. 26, 2012, now Pat. No. 9,377,230.

(Continued)

(51) Int. Cl.
*B08B 3/00* (2006.01)
*F16K 31/36* (2006.01)
(Continued)

(52) U.S. Cl.
CPC .......... *F16L 55/055* (2013.01); *F04B 49/065* (2013.01); *F04B 49/20* (2013.01);
(Continued)

(58) Field of Classification Search
CPC ......... F04B 49/20; F16L 55/055; F25B 30/02; F25B 49/027
(Continued)

(56) References Cited

U.S. PATENT DOCUMENTS 3,593,957 A * 7/1971 Dolter .................. F16K 31/404
                                                      251/30.03
3,625,249 A * 12/1971 Karr ........................ F16K 15/03
                                                      137/497

(Continued)

OTHER PUBLICATIONS

United States Patent and Trademark Office, Requirement for Restriction/Election issued for U.S. Appl. No. 13/627,438, dated Apr. 10, 2015.

(Continued)

*Primary Examiner* — Henry Crenshaw
(74) *Attorney, Agent, or Firm* — Baker Botts L.L.P.

(57) ABSTRACT

In one embodiment, a water system includes a compressor, a condenser fluidly coupled to the compressor by refrigerant tubing, a modulating motor-controlled valve configured to alter a flow of water through the condenser, an accelerometer mechanically coupled to the water system, and a water system controller. The water system controller may be configured to perform an automated anti-water hammer procedure. During the automated anti-water hammer procedure, the water system controller may be configured to activate an operating procedure for the water system, transmit a control signal to the modulating motor-controlled valve, receive vibrational measurements received from the accelerometer, compare the vibrational measurements measured by the accelerometer to a predetermined vibration level associated with the operating procedure, and adjust the opening position and opening speed of the modulating motor-controlled valve for the operating procedure if the vibrational measurements exceed the predetermined vibration level associated with the operating procedure.

20 Claims, 11 Drawing Sheets

Related U.S. Application Data

(60) Provisional application No. 61/539,344, filed on Sep. 26, 2011, provisional application No. 61/539,358, filed on Sep. 26, 2011.

(51) Int. Cl.
| | |
|---|---|
| *B01D 65/02* | (2006.01) |
| *F25D 17/02* | (2006.01) |
| *F16L 55/055* | (2006.01) |
| *F25B 30/02* | (2006.01) |
| *F25B 49/02* | (2006.01) |
| *F24D 17/02* | (2006.01) |
| *F24F 1/36* | (2011.01) |
| *F24D 19/10* | (2006.01) |
| *F04B 49/06* | (2006.01) |
| *F04B 49/20* | (2006.01) |
| *F24F 11/00* | (2006.01) |

(52) U.S. Cl.
CPC ......... *F24D 17/02* (2013.01); *F24D 19/1039* (2013.01); *F24F 1/36* (2013.01); *F25B 30/02* (2013.01); *F25B 49/02* (2013.01); *F25B 49/027* (2013.01); *F24F 2011/0054* (2013.01); *F25B 2339/047* (2013.01); *F25B 2400/06* (2013.01)

(58) Field of Classification Search
USPC ............ 134/44; 137/497; 210/636; 239/722; 62/185
See application file for complete search history.

(56) References Cited

U.S. PATENT DOCUMENTS

| | | | |
|---|---|---|---|
| 4,213,306 A | 7/1980 | Peabody et al. | |
| 4,241,897 A * | 12/1980 | Maezawa | F16K 1/221 251/229 |
| 4,270,352 A | 6/1981 | Lancia et al. | |
| 4,553,401 A | 11/1985 | Fisher | |
| 5,161,386 A * | 11/1992 | Higuchi | F25B 13/00 62/160 |
| 5,440,890 A | 8/1995 | Bahel et al. | |
| 5,477,701 A | 12/1995 | Kenyon et al. | |
| 5,509,274 A | 4/1996 | Lackstrom | |
| 5,878,310 A | 3/1999 | Saito et al. | |
| 5,950,439 A | 9/1999 | Peterson et al. | |
| 5,961,051 A * | 10/1999 | Matsui | B05B 1/1636 137/505 |
| 5,993,739 A | 11/1999 | Lyon | |
| 6,189,323 B1 | 2/2001 | Nakamura et al. | |
| 6,427,461 B1 | 8/2002 | Whinery et al. | |
| 6,664,049 B1 | 12/2003 | Chevalier | |
| 6,826,921 B1 | 12/2004 | Uselton | |
| 6,845,627 B1 * | 1/2005 | Buck | B64D 11/04 165/919 |
| 6,973,794 B2 | 12/2005 | Street et al. | |
| 6,999,996 B2 | 2/2006 | Sunderland et al. | |
| 7,047,753 B2 | 5/2006 | Street et al. | |
| 7,270,278 B2 | 9/2007 | Street et al. | |
| 7,823,404 B2 | 11/2010 | Hanson | |
| 2001/0045097 A1 | 11/2001 | Pham et al. | |
| 2002/0017107 A1 | 2/2002 | Bailey et al. | |
| 2002/0113134 A1 | 8/2002 | Laing | |
| 2004/0244394 A1 | 12/2004 | Nakayama et al. | |
| 2005/0077401 A1 * | 4/2005 | Sinden | A01G 25/097 239/722 |
| 2005/0187665 A1 | 8/2005 | Fu | |
| 2005/0240312 A1 | 10/2005 | Terry et al. | |
| 2005/0252226 A1 | 11/2005 | Seefeldt | |
| 2006/0011753 A1 * | 1/2006 | Sinden | A01G 25/097 239/722 |
| 2006/0048404 A1 | 3/2006 | Tadano et al. | |
| 2007/0025861 A1 * | 2/2007 | Yaguchi | F04B 17/04 417/44.1 |
| 2007/0286751 A1 * | 12/2007 | Manole | F04B 35/045 417/417 |
| 2008/0022694 A1 | 1/2008 | Anderson et al. | |
| 2008/0198529 A1 | 8/2008 | Rembold | |
| 2009/0077992 A1 | 3/2009 | Anderson et al. | |
| 2009/0113911 A1 | 5/2009 | Nakayama | |
| 2009/0139255 A1 | 6/2009 | Hombucher | |
| 2010/0011793 A1 | 1/2010 | Tiranno et al. | |
| 2010/0107658 A1 | 5/2010 | Cockrell | |
| 2010/0117843 A1 | 5/2010 | Kobayashi | |
| 2010/0275628 A1 | 11/2010 | Moseley | |
| 2011/0163082 A1 * | 7/2011 | Mullen | G05B 23/0275 219/494 |
| 2012/0019451 A1 | 1/2012 | Chen et al. | |
| 2013/0091883 A1 | 4/2013 | Perez et al. | |
| 2016/0265707 A1 * | 9/2016 | Perez | F25B 30/02 |

OTHER PUBLICATIONS

United States Patent and Trademark Office, Non-Final Office Action issued for U.S. Appl. No. 13/627,438, dated Jun. 11, 2015.
United States Patent and Trademark Office, Final Office Action issued for U.S. Appl. No. 13/627,438, dated Dec. 4, 2015.
United States Patent and Trademark Office, Notice of Allowance issued for U.S. Appl. No. 13/627,438, dated Feb. 25, 2016.

* cited by examiner

CONTROLLER, METHOD OF OPERATING A WATER SOURCE HEAT PUMP AND A WATER SOURCE HEAT PUMP

CROSS-REFERENCE TO RELATED APPLICATION

This application is a continuation of U.S. patent application Ser. No. 13/627,438 filed Sep. 26, 2012 and entitled "Controller, Method of Operating a Water Source Heal Pump and a Water Source Heat Pump," which is based upon and claims priority to (1) U.S. Provisional Patent Application No. 61/539,344, filed on Sep. 26, 2011 and entitled "Multi-Staged Water Manifold System for Roof Top Unit" and (2) U.S. Provisional Patent Application No. 61/539,358, filed on Sep. 26, 2011 and entitled "Control Systems for Multi-Staged Water Manifold System for Roof Top Unit," both of which are incorporated herein by reference.

TECHNICAL FIELD

This application is directed, in general, to a water source heat pump (WSHP) and, more specifically, to a controller and control systems for a WSHP having a multi-stage fluid delivery system.

BACKGROUND

Water source heat pumps (WSHP) are presently used in large commercial or residential buildings' cooling systems. These WSHP systems capture waste heat from refrigeration-racks and use it to heat stores in winter, reduce peak loading in summer. Also, these systems are very similar to chiller systems that are also well known with the exception that they can also run in a reverse cycle and function as a heat pump, thereby allowing them to function for both winter and summer heating/cooling applications. Basically, the unit uses a refrigerating system to cool or heat water, which is used as a heat exchange mechanism to remove or add heat to the system. The water passes through a condensing coil and removes heat from the heat refrigerant before passing through the expansion valve. These units are desirable because they are more efficient in heating and cooling large commercial or residential spaces, than standard cooling and heating systems. Though these units are effective in providing heating and cooling to the building intended to be cooled or heated, they are less efficient than desirable, given present day concerns to reduce both power and water consumption.

SUMMARY

In one aspect the disclosure provides a controller. In one embodiment the controller includes: (1) an interface configured to receive operating data and monitoring data from the water source heat pump and transmit control signals to components of thereof and (2) a processor configured to respond to the operating data or the monitoring data by operating at least one motor-operated valve of the water source heat pump via a control signal.

In another aspect, the disclosure provides a computer-usable medium having non-transitory computer readable instructions stored thereon for execution by a processor to perform a method for operating a water source heat pump having at least one motor-operated control valve. In one embodiment, the method includes: (1) receiving operating data and monitoring data from the water source heat pump and (2) operating the at least one motor-operated valve of the water source heat pump based on the operating data or the monitoring data by transmitting a control signal thereto.

In yet another aspect, the disclosure provides a water source heat pump. In one embodiment, the water source heat pump includes: (1) a compressor, (2) a condenser being fluidly coupled to the compressor by refrigerant tubing, (3) output conduit coupled to the condenser and being couplable to a distal location, (4) a modulating motor-controlled valve interposed the output conduit, the modulating motor-controlled valve configured to alter a flow of fluid through the condenser and (5) a water source heat pump controller configured to control operation of the modulating motor-controlled valve by varying a control signal transmitted thereto based on operating or monitoring data received by the controller.

BRIEF DESCRIPTION

Reference is now made to the following descriptions taken in conjunction with the accompanying drawings, in which.

DETAILED DESCRIPTION

The disclosure provides a WSHP system with improved failure/protection schemes. Additionally, the disclosure includes various control schemes to improve the performance of a WSHP system. A controller is disclosed that is configured to direct the disclosed failure/protection schemes and improved operation schemes. In one embodiment, the controller is a dedicated controller for the WSHP system. In another embodiment, the controller is a roof top unit (RTU) controller that is configured to include the necessary circuitry, operating instructions, or combination thereof to perform the various functions described herein. In some embodiments, the different functions or schemes described herein may be performed by various controllers. For example, a RTU controller and a dedicated WSHP controller may each perform some of the disclosed functions or schemes.

Figure 1:
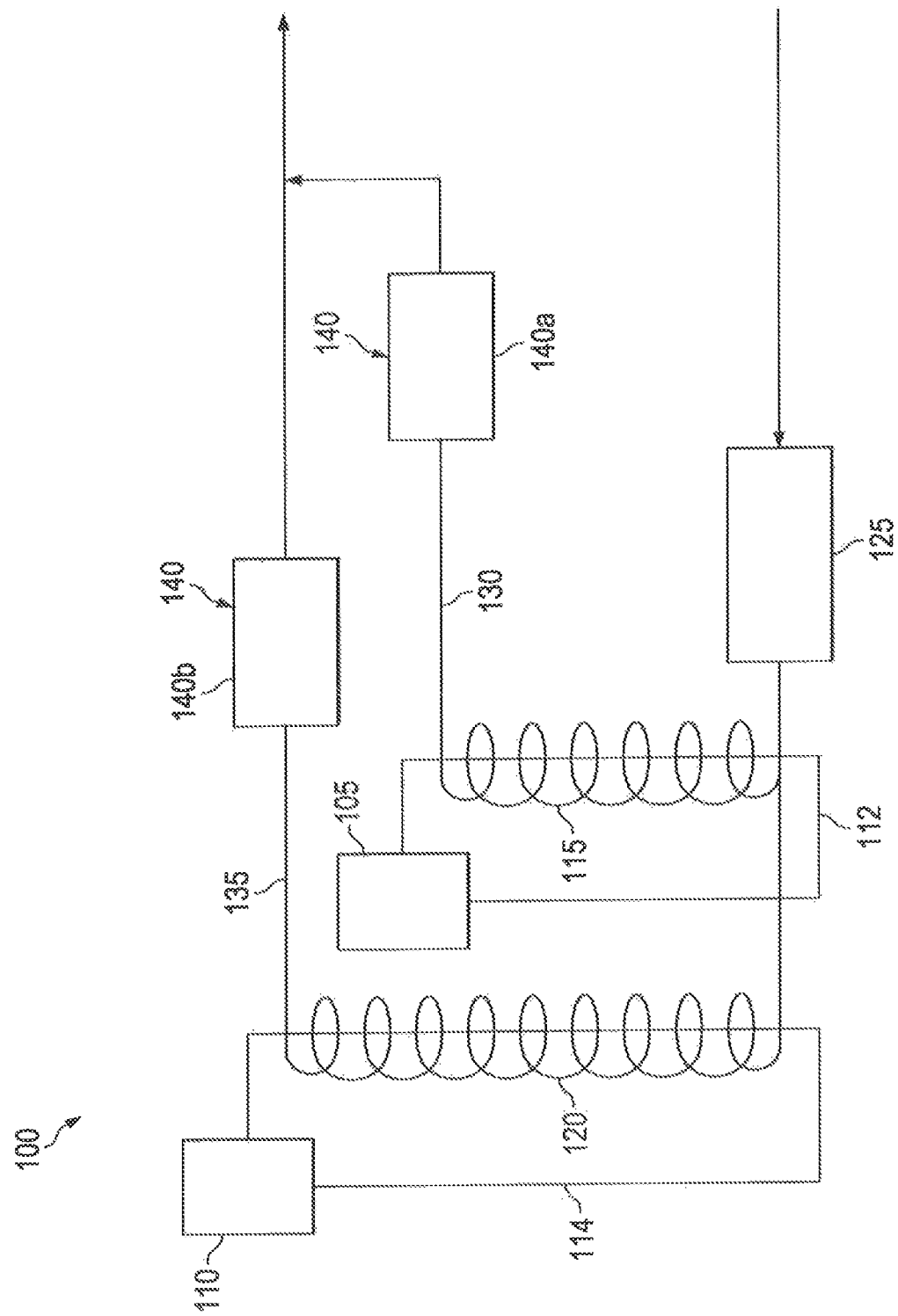
FIG. 1 illustrates a schematic diagram showing the multi-stage configuration of the heat pump system as provided herein.

FIG. 1 illustrates a schematic diagram of a multi-stage fluid control system for a fluid WSHP unit 100 as covered by the embodiments discussed herein and which can be used in conjunction with a conventional roof top unit (RTU). For purposes of understanding this disclosure and claims, it should be understood that the term "refrigerant" pertains to the refrigerant fluid flowing through the compressors 105, 110 and "fluid" pertains to any heat exchange fluid flowing through the condensers 115, 120. This particular embodiment comprises compressor 105, 110 that are configured to operate in separate, heat exchange stages. The compressors 105, 110, may be of conventional design and are operated in separate cycles, or when more than two compressors are present, multiple compressors may be operated at the same time. For example, if four compressors are present, two compressors may be operated together in a first operation cycle or stage, and the remaining two compressors may be operated together in a second operation cycle or stage. Alternatively, the four compressors may operate in separate, first, second, third and fourth stages. As used herein and in the claims, "stage" means a refrigerant cycle operation where the compressor is operating and refrigerant is passing through the associated condenser, and heat exchange is occurring between the refrigerant flowing through the compressors 105, 110 and the fluid, such as water, glycol, or some other known heat exchanging fluid, passing through the condensers 115 or 120.

Condensers 115, 120 are each fluidly coupled to at least one different compressor 105 or 110 by refrigerant tubing 112, 114, to form separate refrigerant cycles with the compressor to which the condenser 115, 120 is coupled. In certain embodiments, each of the condensers 115, 120 is coupled to a different compressor 105, 110, however, in other embodiments, one of the condensers 115, 120 may be coupled to more than one compressor. The condensers 115, 120 have intake ends coupled together by a fluid intake manifold 125. The manifold 125 is common to the condensers 115, 120 and provides fluid flow into the condensers 115, 120. Also the condensers 115, 120 may be of conventional design, such as concentric coil condensers, as those illustrated herein, or they may be a conventional brazed-plate condenser. The condensers 115, 120 are designed to have separate refrigerant and fluid paths through which heat exchange occurs. Moreover, it should be understood that while only two compressors and two condensers are shown, the present disclosure is not limited to this particular numerical design and is expandable to accommodate different heat/cooling needs of a given structure.

This embodiment further includes output conduits 130, 135, respectively, coupled to each of the condensers 115, 120. The output conduits 130, 135 are couplable to a distal location, which is a location outside the heat pump system 100, such as a user's building water system, including a cooling tower or a RTU. The output conduits 130, 135 can be joined together downstream from the condensers 115, 120 to provide a common conduit to the distal location, as shown. Further included, is a modulating valve control system 140 interposed the output conduits 130, 135. The modulating valve control system comprises separate modulating valves 140a, 140b that are interposed the conduits 130, 135 of the respective condensers 115, 120 with which it is associated. Modulating valves 140a, 140b are capable of proportionally controlling water by going from fully open to fully closed; or by going from a water flow setpoint determined by a RTU unit controller to a closed position (no water flow) determined by the RTU controller. Water setpoint is a flow in gallons per minute (GPM) or on a temperature drop (Delta T) through the water cooled condenser. This value can either be factory set or field/customer configurable. This represents a significant cost savings by not having to have dedicated automatic temperature controllers (ATC's) or automatic temperature/flow controls on each water/refrigerant stage in addition to the motorized on/off shut off valve. Additionally, as explained below, in other embodiments, the modulating valve control system 140 may also include a controller that can comprise one or more microprocessors and is configured to control the operation thereof. The modulating valve control system 140 is configured to control a flow of fluid through the condensers 115 or 120, based on the required operation of the compressor 105 or 110 to which the condenser 115 or 120 is respectively coupled.

For example, in a stage 1 heat exchange cycle and just before the compressor 105 is activated, a signal goes out to the modulating valve control system 140 from a controller, which causes the valve 140a to open. This allows a flow of fluid to begin flowing through condenser 115 for a short period of time and charge the condenser 115 with fluid. Following this brief period of time, compressor 105 is then activated. During stage 1, valve 140b remains in the closed position, as long as there is not a need to activate compressor 110 with which condenser 120 is associated, thereby preventing a flow of fluid through condenser 120. However, if there is a call from a controller for stage 2 operation, a signal goes out to the modulating valve control system 140, which causes the valve 140b to open, just prior to the activation of compressor 110, which allows condenser 120 to be charged with fluid. The opening of the valve 140b allows a flow of fluid through condenser 120 during the operation of compressor 110. Thus, where there is only a need for stage 1 operation, fluid is flowing only through the condenser 115, which is associated with compressor 105. Alternatively, when there is a need for both stage 1 and stage 2 operation, fluid is flowing through both of the condenser 115, 120 during the operation of compressors 105, 110.

In view of the above, fluid flow through the condensers 115, 120 is controlled by the valve control system 140 in such a way that only the fluid that is needed to meet heating/cooling requirements is pumped through the condenser associated with the operating compressor. This is in stark contrast to conventional, single stage systems where fluid flows through each condenser regardless of which compressor stage is operating. In such conventional systems, no staged multiple valve controls are present, so fluid is flowing through all the condensers when any one of the compressors is operating. As such, there is no staging of fluid flow through the condensers with the operation of the compressors. As a result, all of the fluid pumps run at all times during the operation to maintain the required pump pressure within the system. This constant pump operation requires more pump energy than the embodiments provided by this disclosure.

Figure 2:
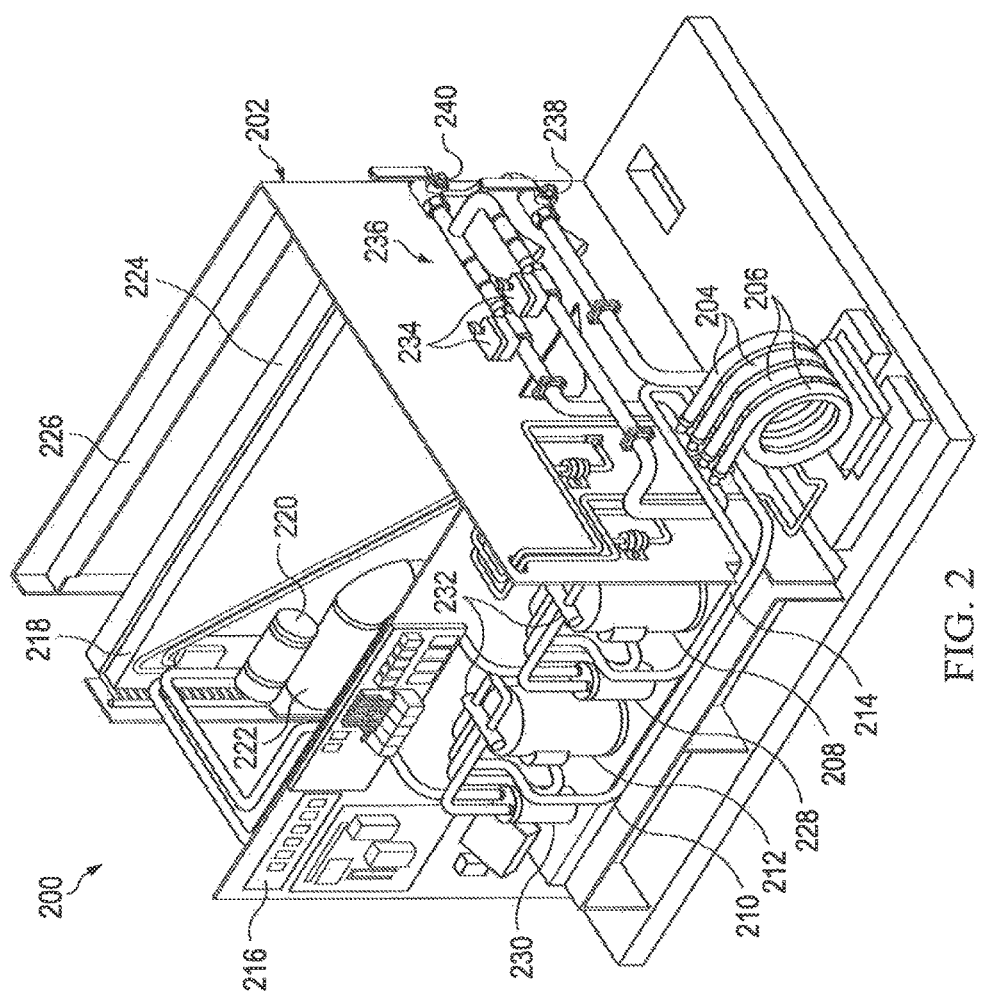
FIG. 2 illustrates a perspective view of one embodiment of a WSHP according to FIG. 1.

In operation, fluid, such as water from a distal location, is pumped toward the WSHP unit 100. In a cooling operation mode, the refrigerant within each refrigeration circuit leaves the associated compressor as a hot gas. When the hot refrigerant gas passes through the refrigerant path within condensers 115 or 120, it transfers heat to the fluid that flows through a fluid path within the condensers 115 or 120. The refrigerant becomes cooler and turns to a liquid state before passing through an expansion vale, not shown, after which it quickly expands into a cold gas as it passes through an evaporator or indoor coil as seen in FIG. 2, as described below. Of course, in a heating mode, the above described cycle is reversed to provide heat to the indoor coils.

As noted, above each stage 1 (compressor 105 and condenser 115) and stage 2 (compressor 110 and condenser 120) has separate modulating control valves 140a and 140b associated with them. As such, these modulating control valves 140a and 140b control the fluid through the condensers 115, 120 in a staged manner, such that only the condensers associated with active refrigeration circuits have refrigerant and fluid passing through them. Moreover, modulating control valves 140a and 140b can be specifically designed to include a motorized actuator, automatic flow control, and 3-way valves (for by-pass). In such embodiments, the motorized actuators are opened when the respective compressors are energized with thermostat demand signals Y1, Y2, . . . and W1, W2 . . . , etc. The condensers 115, 120, which are, in certain embodiments, arranged in a parallel arrangement, are coupled together by the manifold 125 so that fluid is able to flow though only the condenser that has an active refrigeration circuit. Thus, a matching in refrigerant flow with fluid flow can be achieved, and only fluid that is doing the work will be pumped at any given point in time. Moreover, these systems can provide a variable flow rate and allow the flow rate to be staged to coincide with the number of active compressors within the systems at any given point in time, which provides significant pump volume and energy savings. The flow rate is reduced and that in turn has a significant impact to the pump horse power, which results in energy savings.

With the present disclosure, it has been found that staging the fluid through the condensers 115, 120 provides a system that saves energy, by reducing the fluid required to run the pumps by up to about 50% in part load conditions in a two compressor system. This translates to about 86% savings in pump energy, when using a typical speed controlled centrifugal pump water system. Moreover, in a four compressor system, flow rate reduction can be increased further, even up to about 75%, which can translate into as much as about 97% savings in pump energy, when using a typical centrifugal pump water system. As such, this unique configuration allows not only a reduction of fluid flow but a significant pump energy savings over conventionally designed systems.

FIG. 2 illustrates one configuration of the WSHP system 100, as generally discussed above. In this embodiment, a WSHP unit 200 includes a housing frame 202 on which the various components of the WSHP system 200 are placed, and the condensers mentioned above regarding FIG. 1 are water condenser coils 204, 206, wherein each of the condenser coils 204, 206 includes two coils. The condenser coils 204, 206 may be of conventional design with each of the dual coils comprising two concentric tubes that form a separate refrigerant path and fluid path within them. As shown, condenser coil 204 is coupled to compressor 208 by refrigerant tubing 210 to form a first refrigerant cycle, or stage 1, and condenser coil 206 is coupled to compressor 212 by refrigerant tubing 214 to form a second refrigerant cycle, or stage 2. Though only two compressors and two coils are shown, it should be understood that the system can be expanded to include multiple coils and compressors in a 1:1 coil/compressor ratio. As such, the system can easily be expanded for increased capacity as design requires.

The two above-mentioned stages share a common intake water manifold, not shown in this view that is located at the bottom of the condensing coils 204 and 206 and supplies water to both coils. The first and second stage condensing coils 204, 206 form separate fluid paths and the water, though taken in through the common manifold, is not intermixed once the fluid enters each of the stage 1 and stage 2 coils 204, 206. The stage 1 and stage 2 condensing coils 204, 206 are comprised of concentric tubes in which the most center tube forms the water path and the outer, larger concentric tube forms the refrigerant path. The temperature difference between the refrigerant and water flowing through the concentric tubes allows for the heat exchange to occur. The operations of the WSHP unit 200, as described herein, are controlled by a unit controller 216 and can include the programming and one or more microprocessors and microcircuits boards necessary to implement the embodiment described herein.

Compressors 208 and 212 are fluidly connected to an indoor evaporator coil 218 through which air is directed by a motor 220 and fan 222 through filter 224 and an optional economizer damper 226. The illustrated embodiment also includes a conventional first charge compensator 228 associated with compressor 208 and a conventional second charge compensator 230 associated with compressor 212. The compressors 208 and 212 also have first and second reverse valves 232, respectively associated therewith to allow the refrigerant flow direction, and subsequently the refrigeration cycle in the unit to be operated in reverse. The unit 200 further includes the valve control system 234, conduit system 236, including water input and outputs 238, 240, which are explained in more detail below.

Figure 3:
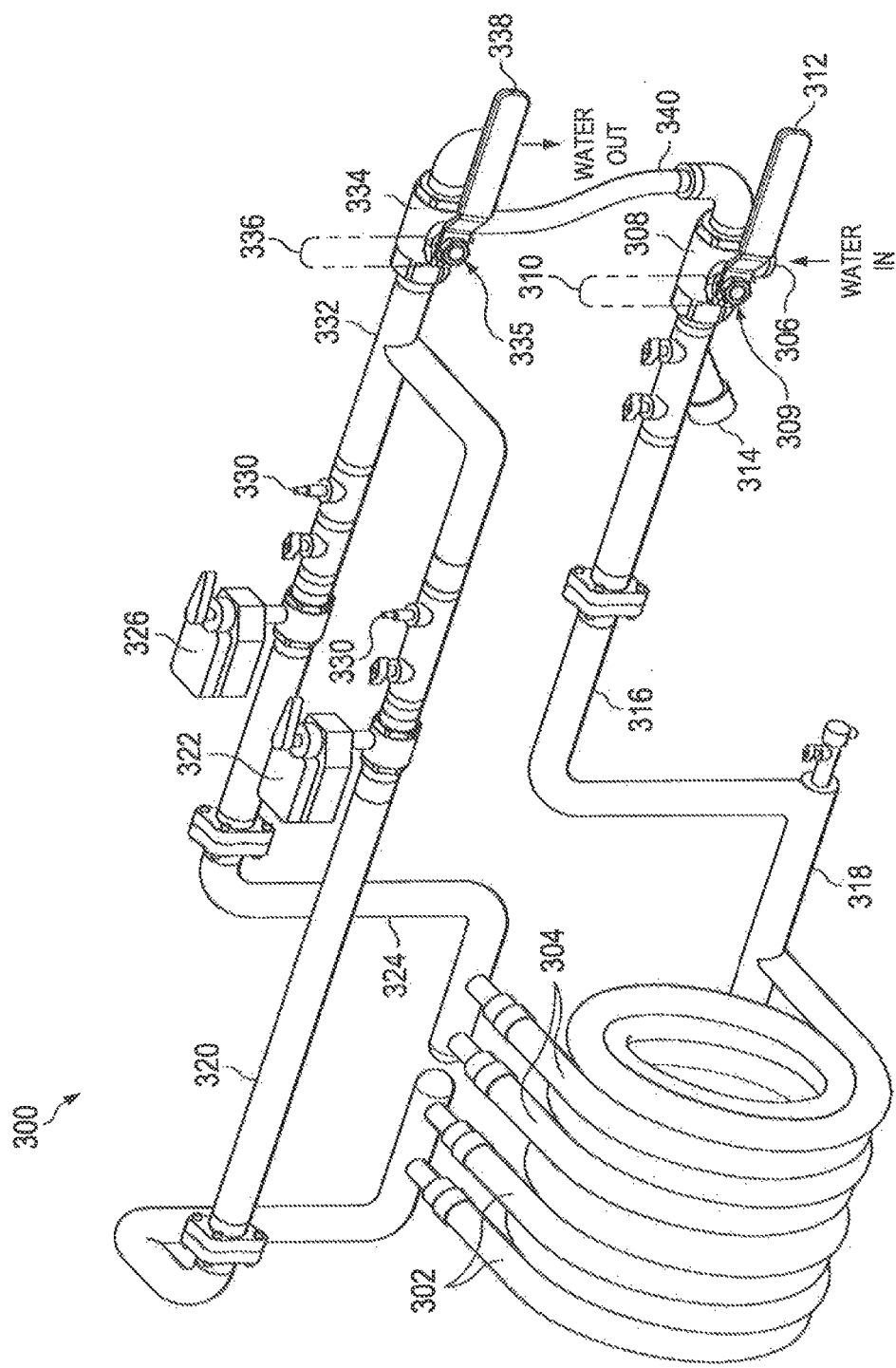
FIG. 3 illustrates a perspective view of one embodiment of the fluid control system associated with the WSHP of FIG. 2.

FIG. 3 is a partial view of the WSHP unit 200 of FIG. 2 that illustrates the condensers, conduits, and valve control system 300 of the WHSP unit 200. The drain pan 9 illustrated in FIG. 17 can be positioned under these components of the WSHP to aid in leak detection. In this embodiment the system 300 has a two stage quad condensing coil configuration wherein each stage includes two condensing coils 302, 304. This embodiment further illustrates a common water inlet point 306 that is couplable to a water source from a distal use point, such as a user's structure or cooling tower. The water can pass through a three-way valve 308 that is positioned in a by-pass position 310 or a main loop position 312. The three-way valve 308 is connected to a strainer 314 that moves foreign debris from the water flowing through the system 300. Conduit pipe 316 leads from the strainer 314 to a manifold 318 that feeds both the condensing coils 302, 304. The stage 2 coil 302 is connected by a conduit 320, on its outlet side, to a stage 2-flow control valve 322, and the stage 1 coil 304 is connected by conduit 324, on its outlet side, to a stage 1 flow control valve 326, as shown. The separate outlet conduits 320 and 324 and control valves 322 and 326 allow for a staging of the water flow through the WSHP system 200 of FIG. 2, as explained above. Once the water passes through either one or both of the control valves 322, 326, it passes through air event sections 326, 330, after which, conduits 320 and 324 merge into a single conduit 332. Using the motor actuator control valves 322, 326, to control water flow allows the benefit of not using a flow regulator on each of the stages. The water then passes through three-way valve 334 and to the distal point of use, provided the three-way valve 334 is in a main loop position 336. However, if the three-way valves 334 and 308 are in the by-pass position 338 and 312, the water travels through the flexible hose 340 and back out of the unit, by-passing the condensers, conduits and valve control systems. As described below in different control schemes, the three-way valves 308, 334, can be controlled by a controller to move the valves into the various positions. In FIG. 3, the three-way valves 308, 334, are illustrated as manual valves to show the various positions. Each of the three-way valves 308, 334, is also a controllable valve as the valves 321, 326, and both include a motorized actuator as illustrated in FIG. 3 with valves 322, 326. The motorized actuators for valves 322, 326, are represented by elements 309 and 335, respectively, wherein the arrows indicate the valves that are controlled. In one embodiment, a controller can send a 0-10 volt signal to direct the actuators to cause the three-way valves 308, 334, to move to desired positions. For example, the three-way valves 308, 334, can be remotely controlled to connect or disconnect the WSHP system 300 from a water source such as the building's water system and provide different modes of operation. By-pass mode provides advantages daring water system commissioning and start up, by allowing external water-loop connections in the building to be pressure checked, flushed and drained without exposing any of the flow control and condenser heat exchanger to potentially damaging high-air pressures. It's common practice to use high pressure and non chemically treated water to flush contaminants from the building water loop piping systems during the startup process. If the WSHP is left connected during the flushing process there is the potential to expose the WSHP to a high concentration of contaminants and cleaners could potentially damage the copper and brass materials that are commonly used in water cooled condenser flow control and heat transfer systems. Another advantage of having a flow-control system w/ a built-in bypass mode is the ability to repair and/or replace systems down-stream of the main water loop w/o having to disconnect the connection points between the building's main water loop and the RTU.

The foregoing embodiments disclose an improved WSHP that allows staging of the condensers in tandem with only the compressors that are operating. This reduces pump energy in that pump pressure is reduced and allows significant savings in energy costs and water consumption in the operation of the WSHP unit. Moreover, this savings in pump energy, derived from restricting fluid flow to non-active condenser circuits does not impact the operations efficiency of the refrigeration system.

Figure 4:
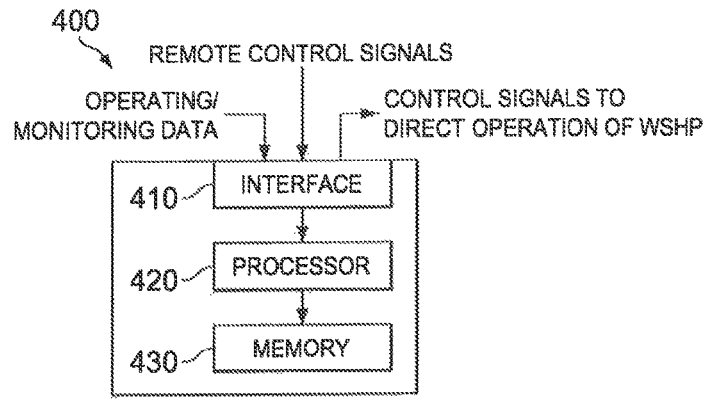
FIG. 4 illustrates a block diagram of an embodiment of a controller constructed according to the principles of the disclosure.

FIG. 4 illustrates a block diagram of an embodiment of a controller 400 constructed according to the principles of the disclosure. The controller 400 is configured to direct the operation of or at least part of the operation of a WSHP system, such as the WSHP system of FIG. 100, 200 or 300. As such, the controller 400 is configured to generate control signals that are transmitted to the various components to direct the operation thereof. The controller 400 may generate the control signals in response to feedback data chat is received from various sensors and/or components of the WSHP system, such as water/moisture sensors, float-switches, temperature sensors and accelerometers. The sensors can be conventional sensors that are positioned in the WSHP system, RTU or enclosed space being cooled/heated and connected to the controller 400 via conventional wired or wireless means. One skilled in the art will understand the use, positioning and attachment of the various sensors that are used to provide data to the controller 400 as input for the controller to use to direct the operation of the WSHP system. The controller 400 includes an interface 410 that is configured to receive and transmit the feedback data and control signals. The interface 410 can also be configured to receive programming data for directing the operation of a WSHP system. The interface 410 may be a conventional interface that is used to communicate (i.e., receive and transmit) data for a controller, such as a microcontroller.

The controller 400 also includes a processor 420 and a memory 430. The memory 430 may be a conventional memory typically located within a controller, such as a microcontroller, that is constructed to store data and computer programs. The memory 430 may store operating instructions to direct the operation of the processor 420 when initiated thereby. The operating instructions may correspond to algorithms that provide the functionality of the operating schemes disclosed herein. For example, the operating instructions may correspond to the algorithm or algorithms that implement a method or methods of operation illustrated in FIGS. 5-16. The processor 420 may be a conventional processor such as a microprocessor. The interface 410, processor 420 and memory 430 can be coupled together via conventional means to communicate information. The controller 400 can also include additional components typically included within a controller for an HVAC system, such as a power supply or power port.

The controller 400 is configured to provide and operate the WSHP system according to various operating schemes including protection schemes. In one embodiment, the controller 400 is configured to provide automated freeze protection of a water cooled condenser in the roof top unit (RTU) using a temp-sensor to determine when freezing conditions are approaching regarding the water cooled condenser. In such instances, the compressor in RTU (in cooling mode) is turned on to raise discharge temp and temperature in the condensing coil to prevent freezing. The freeze protection system may have adjustable set-points as well as an adjustable service-relay output to allow the unit to go into cooling for a short time to help the coil from freezing. Such embodiments provide the benefits of cost reduction, improved reliability, and the elimination of an ambient heater, all of which provides both cost and energy savings. Thus, the controller 400 is configured with the necessary operating instructions (e.g., stored in the memory 230) to reduce energy consumption.

In another embodiment, controller 400 is configured to provide an automated freeze protection system for the piping in a closed-loop water source heat pump. In such systems, the compressor is operated in a cooling mode, to transfer refrigerant heat to the closed loop water coil piping system that may serve multiple RTU's. The controller 400, which can be employed in the WSHP system or a separate controller, can be programmed to cycle a gas-fired heat exchanger associated with the RTU to re-heat the supply air back to the heating setpoint. This system can easily be automated, linked to enter water temp at the RTU, or can be initiated by the building management system and an HVAC control interface. Such an embodiment can provide cost reduction, elimination of a gas-fired boiler in a close-loop water system, improvement in reliability, simplification of the water source system and the elimination of boiler maintenance, thereby reducing installation costs associated with the installation of the WSHP.

In another embodiment, the controller 400 is configured to provide an automated ambient heater control feature in RTU controller can be included to prevent the water in the condenser coil from freezing when it is turned off and it's below freezing outside. This embodiment can also provide the benefit of reducing energy consumption.

In another embodiment, the controller 409 is configured to provide an automatic dynamic water flow control. In this embodiment, the controller 400 can be used to maintain a constant temperature change across the water cooled condenser coil by sending a 0-10V signal to a fully modulating actuator controlling an adjustable ball-valve such as 322 an 326 in FIG. 3. Additionally, the controller 400 can be used to increase water flow in part-load conditions and allow field selectable temperature delta temperature both for part-load and full-load cooling demands through the implementation of an appropriate algorithm stored in the memory 430 of the controller 400 or a separate controller. This embodiment provides the benefits of cost reduction, elimination of a flow-cartridge, reduction of pressure drop and reduced pump energy, flexibility of installations with varying water flow rates, increased efficiency when extra pump energy is available during part-load cooling operation, and the prevention of the fluctuation in pump head pressure from affecting unit performance.

Figure 17:
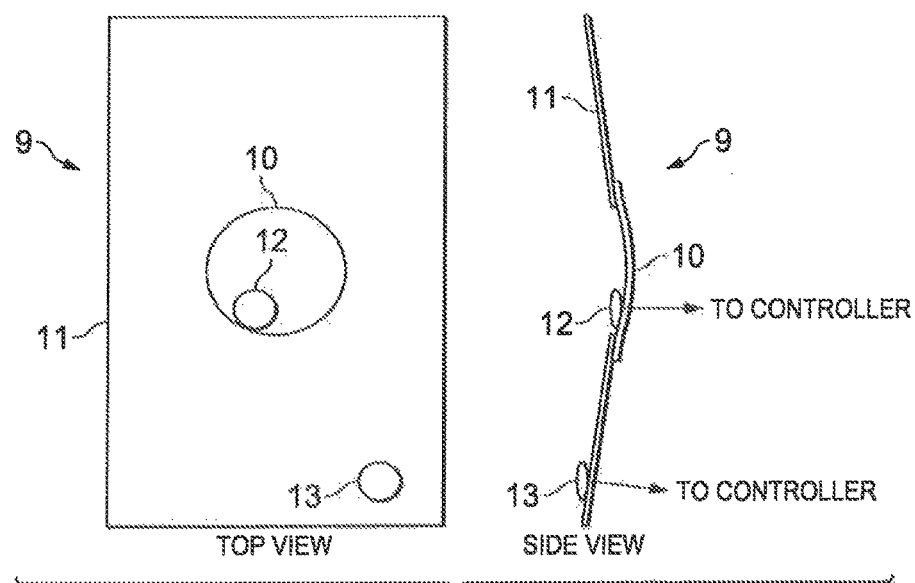
FIG. 17 illustrates a diagram of an embodiment of a drain pan constructed according to the principles of the disclosure.

In another embodiment, the controller 400 is configured to provide an automatic emergency water shut-off feature. One aspect of this embodiment employs a sensor in the water cooled condenser compartment. If water is sensed in the compartment, the controller 400 is configured to close the water intake valve 308 to position 312, and outlet valve 334 to position 338 and send an emergency signal to the building control system (e.g., a management system). This particular embodiment provides the benefits of improved system reliability, active leak detection and reporting, prevention of leakage of fluid used in closed loop condenser systems from draining into a membrane roof or going into a storm run-off system, prevention of a leak in a single unit from escalating into a closed-loop system shutdown, and the prevention of leaking fluid down into store, through pipe connection area. A drain pan as illustrated in FIG. 17 can be employed with this function of the controller 400.

In another embodiment the controller 400 provides an automatic condenser anti-corrosion flush-cycle that can be implemented by sending a 0-10V signal to a fully modulating actuator 322 add 326 controlling an adjustable ball-valve. The processor 420 can interactive with an algorithm written in the memory 430 no configure the actuator to open and close a water-cooled condenser at timed intervals to prevent corrosion and scaling associated with long-term standing water, which can have a negative effect on system performance/efficiency. This embodiment provides the benefits of preventing deposits and scale in condenser coils that could lead to early replacement of condenser coils, and helps maintain uniform water chemistries in closed-loop water cooled systems.

In another embodiment the controller 400 provides an automatic emergency heat mode for the WSHP unit. In this embodiment, the controller 400 automatically brings in supplemental heat in case the unit is unable to satisfy the buildings heating load and/or supply temporary emergency heat. When the WSHP unit enters emergency heat mode, a signal will be issued to the building management system to alert them of lack of heating capacity. The building management system alert can be toggled on or off at the controller 400. Supplemental heat can then be delivered with either electric resistance elements or a gas-fired combustion heat exchanger. This embodiment provides the benefits of increased customer comfort, the elimination of no-heat conditions, redundant heating capability for WSHP's, allows higher peak heating loads on closed loop systems, and replaces the need to have a boiler, thereby reducing costs.

In another embodiment the WSHP system includes a humidifier, such as those disclosed in U.S. Pat. Nos. 6,427,461, 6,664,049, 6,826,921, and 7,823,404, and U.S. patent application Ser. No. 12/888,952, filed Sep. 23, 2010, entitled Air Conditioning System With Variable Condenser Reheat And Refrigerant Flow Sequencer, which are incorporated herein for all intents and purposes. The humidifier component of the WSHP system is configured to dehumidify the air during either heating or cooling cycles by utilizing a row split indoor coil and a water cooled condenser coil, thereby providing a dual purpose unit with reheat and heat pump capabilities in the same unit. The controller 400 is configured to control this embodiment that provides the benefits of increased customer comfort, allows the air conditioning system to operate to reduce humidity in the occupied space without over cooling the space and allows WSHP units to be used in higher humidity environments.

The WSHP disclosed herein is a smart water flow system with smart actuators 322, 326, 335 and 309 that can be operated based on a control signal. The control signal can operate the smart valves between fully closed or fully open or an opening range of 0-100% based on a voltage of the signal. As such, water flow can be changed in the WSHP remotely. Different valves can be operated to alter flow, stop flow and/or bypass flow of water through the WSHP. These valves can be controlled to determine the operation of the WSHP. The smart valves can be modulating motor-controlled valves that employ an actuator for opening and closing the valve. Such conventional modulating valves can be used herein.

In addition to the operating schemes mentioned above, FIGS. 5-16 illustrate flow diagrams of embodiments of methods of operating a WSHP system according to the principles of the disclosure. In at least some of these methods, smart valves are used to perform the various operations or features. The FIGS. 5-16 provide more details of operating schemes noted above or provide additional operating schemes. For each method, the HVAC system can be a WSHP as illustrated in FIGS. 1-3 and these figures are referred to in the various methods. The WSHPs of FIGS. 1-3 include two stages. One skilled in the art will understand that the principles of the disclosure apply to smart valve WSHPs that have only one stage or more than two stages. For example, for a one stage, smart valve WSHP, three smart valves can be used, such as modulating motor-operated valves 322, 308 and 334. For a four stage, smart valve WSHP, six smart valves can be used; two such as 308 and 334, plus four similar to 322 or 326. The controller 216 in FIG. 2 may be configured to perform each of the methods of operation.

Figure 5:
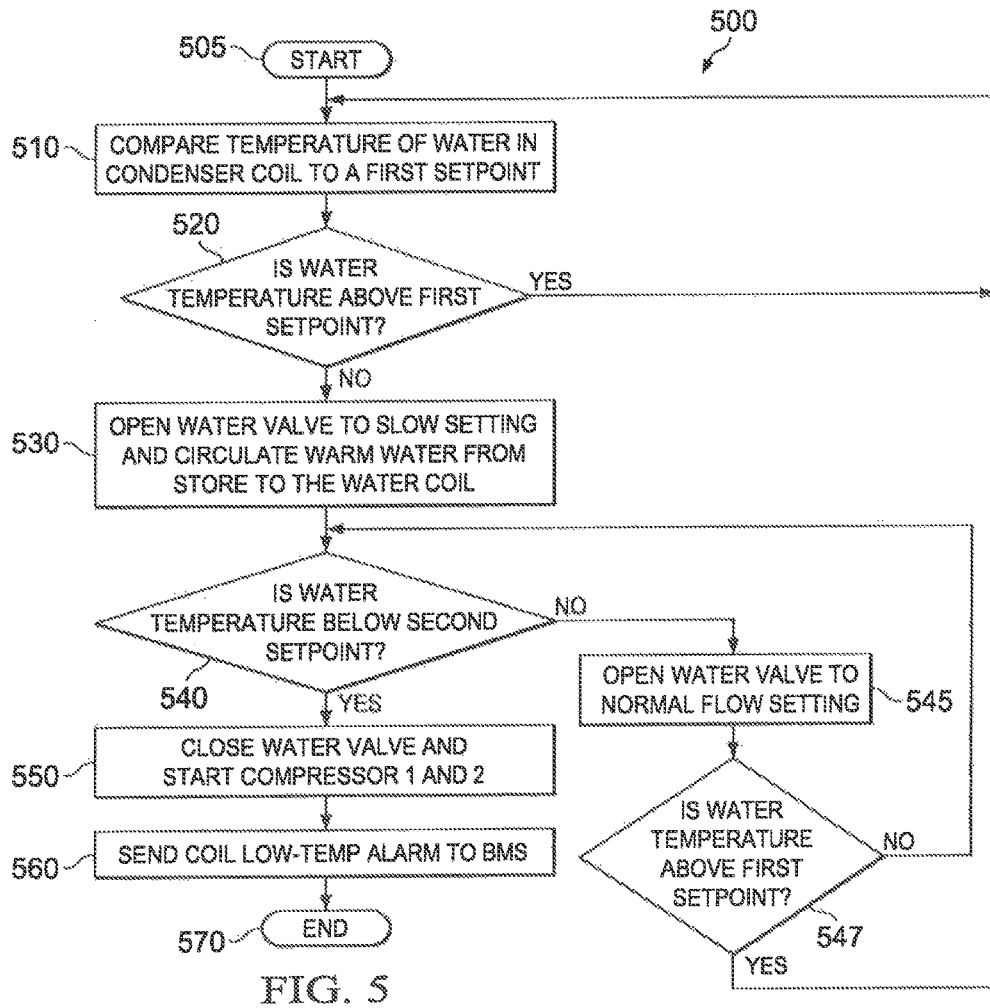
FIG. 5 illustrates a flow diagram of an embodiment of a method of providing automated freeze protection of a water cooled condenser.

FIG. 5 illustrates a flow diagram of an embodiment of a method 500 of providing automated freeze protection of a water cooled condenser. The method 500 begins in a step 505.

In a step 510 water temperature in the condenser coil is compared to a first set point. The first setpoint is selected to prevent freezing of water in the condenser coil and is selected based on when freezing conditions are approaching. For example, a first set point of 40 degrees Fahrenheit can be selected in order to take measures to prevent freezing before approaching the freezing point of 32 degrees Fahrenheit. As mentioned previously, the water in the condenser coil can also be referred to as fluid whereas the liquid in the compressor is referred to herein as a refrigerant. Thus, the water or fluid in the condenser coil can include an antifreeze and the first set point can be selected based on a percentage of the antifreeze in the water and the type of antifreeze.

If the water temperature is above the first set point the method continues to step 510. If the water temperature is not above the first set point the method continues to step 530 where the water valve is opened to a slow setting and to circulate warm water from the closed water loops to the water cooled condenser coil. The valves 322, 326, are opened automatically via control signals and in one embodiment will open to 25% of the normal heating position or equivalent of half a gallon per minute (½ GPM) or GPM per ton of RTU capacity.

A determination is then made if the water temperature in the condenser coil is below a second set point in a step 540. The second set point has a lower value than the first set point and is used to initiate additional measure to prevent freezing of the condenser coil. The second set point can be, for example, 36 degrees Fahrenheit. Again the amount and type of antifreeze can be considered when determining the second set point. If not, the method continues to step 545 where the water valve is opened to the normal flow setting, which is determined by valve opening position that corresponds to normal heating position or equivalent of 2 GPM/Ton of refrigeration. This will increase the water flow going through the condenser coil and, ideally, increase the heat. A determination is then made in a third decisional step 547 if the water temperature in the condenser coil is above the first set point. If so, the method continues to step 510. If not the method continues to step 540.

At step 540, if the water temperature in the condenser coil is below the second set point, the method continues to step 550 where the water valve is closed and compressors 1 and 2 are started. Thus, instead of using heat from the stored water system, the water valves are operated to use heat from the refrigeration system. As such, the controller operates the valves to disconnect from the stored water system.

In a step 560, a coil low-temp alarm is sent to the management system. The management system may be a building management system wherein the WSHP is installed. In response to the coil low-temp alarm, a person, e.g., a repairman, is typically sent to visually check the WSHP. The method ends in a step 570.

Figure 6:
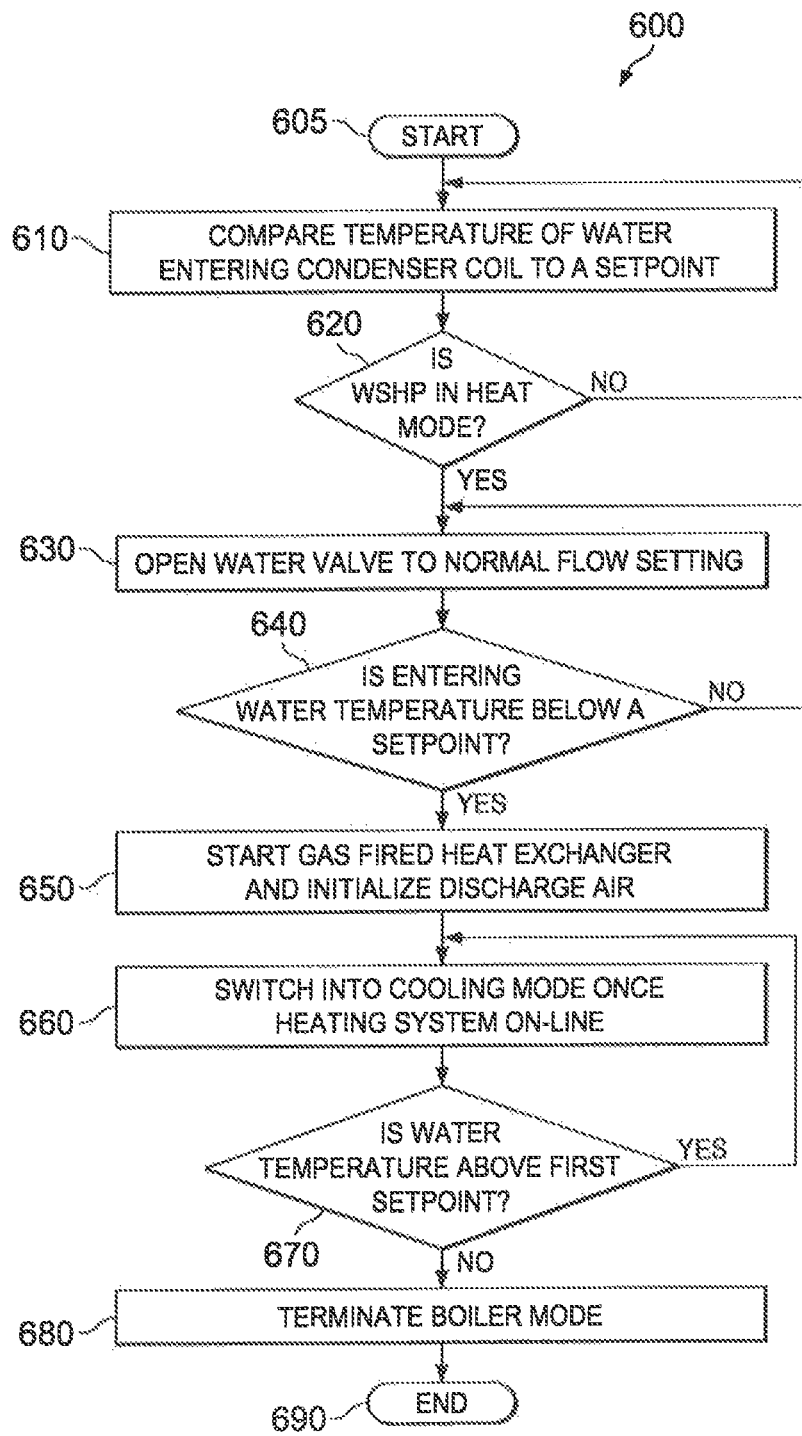
FIG. 6 illustrates a flow diagram of an embodiment of a method of providing automated freeze protection for piping of the WSHP.

FIG. 6 illustrates a flow diagram of an embodiment of a method 600 of providing automated freeze protection for piping of the WSHP. Method 600 operates when the WSHP is in the heating mode, e.g., an enclosed space is being heated. Since heat is being extracted from the water in the heat mode, then the water can freeze in the WSHP even if above freezing before entering the system. As such, the method 600 considers the water temperature before entering the condenser coil. The method 600 begins in a step 605.

In a step 610, the temperature of water entering the condenser coil is compared to the setpoint. The set point can be predetermined based on historical data and can be selected or modified considering real time date such as the present operating modes, temperature of the enclosed area, etc.

A determination is made in a first decisional step 620 if the WSHP is a heat mode. If not the method continues to step 610. If in heat mode, the method continues to step 630 and the water valve is opened for normal water flow. A determination is then made in a second decisional step 640 if the water temperature entering the condenser coil is below the set point. If not the method continues to step 630. If so, the method continues to step 650 where the gas fired heat exchanger (see FIG. 2 for example) is started and the discharge air temperature control mode is initialized. Discharge air temperature control mode uses discharge air temperature at the supply duct to determine the amount of supplemental heat is required to maintain a comfortable discharge air temperature. Gas Heat exchanger is cycled from off/low-heat and high-heat to keep discharge air temperatures at or near a desired set point.

In step 660, the WSHP is switched into cooling mode once the heating system is on-line. As soon as the hot discharge gas from compressors enters the condenser coil, heat is being pumped back into the WSHP system and heating the water cooled condenser while also heating the enclosed space. The WSHP boiler mode is when the RTU is in cooling mode, supplemental heating is used to temper discharge air with either resistant heaters or a gas-fired heat exchanger. A determination is then made in a step 670 if the entering water temperature is below the set point. If so the method 600 continues to step 660. If not, the method continues to step 680 and terminates the WSHP boiler mode. The method 600 then ends in step 690.

Figure 7:
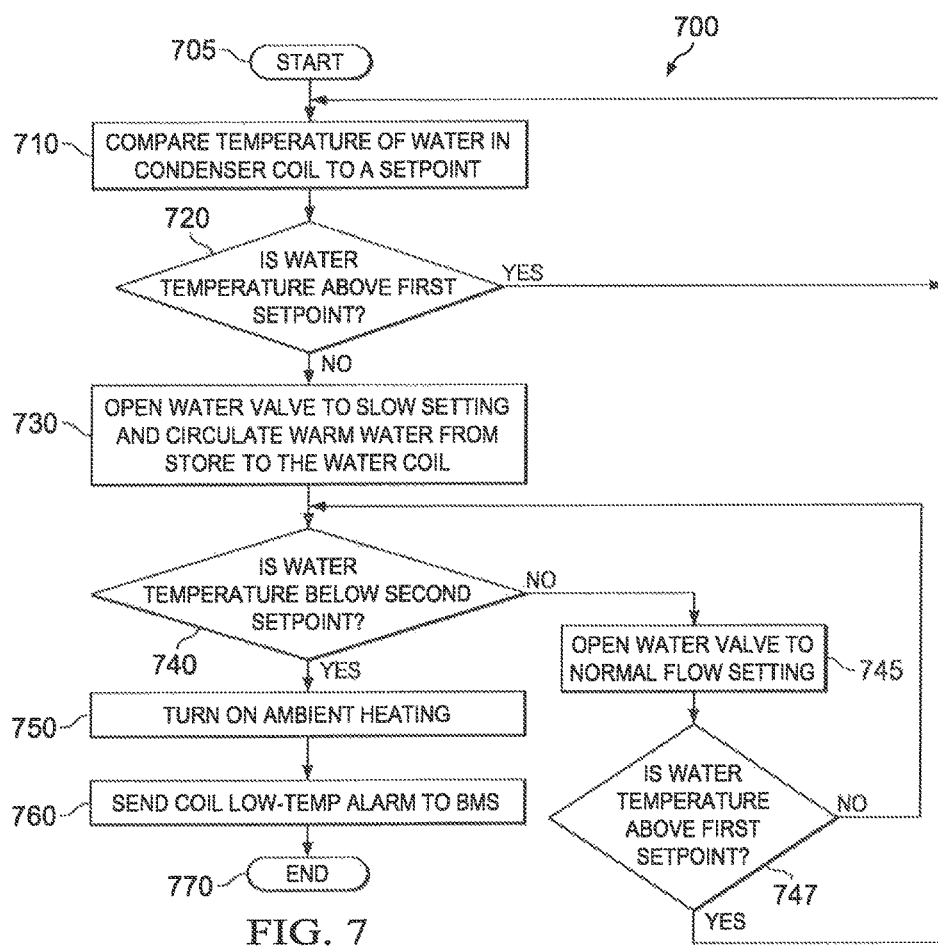
FIG. 7 illustrates a flow diagram of an embodiment of a method of providing automated freeze protection of a water cooled condenser.

FIG. 7 illustrates a flow diagram of an embodiment of a method 700 of providing automated freeze protection of a water cooled condenser. Unlike method 500, method 700 includes the use of ambient heat such as resistance heating. The method 700 begins in a step 705.

In a step 710 water temperature in the condenser coil is compared to a first set point. As noted above, the first set point is selected to prevent freezing of water in the condenser coil and is selected based on when freezing conditions are approaching. The first and second set point of method 700 can be the same set points that are used for method 500. If the water temperature is above the first set point as determined in step 720, the method 700 continues to step 710. If the water temperature is not above the first set point as determined in step 720, the method 700 continues to step 730 where the water valve is opened to a slow setting and to circulate warm water from the store to the water coil. The valves 322, 326, are opened automatically via control signals.

A determination is then made if the water temperature in the condenser coil is below a second set point in a step 740. If not, the method continues to step 745 where the water valve is opened to the normal flow setting. This will increase the water flow going through the condenser coil and, ideally, increase the heat. A determination is then made in a third decisional step 747 if the water temperature in the condenser coil is above the first set point. If so, the method continues to step 710. If not the method continues to step 740.

At step 740, if the water temperature in the condenser coil is below the second set point, the method continues to step 750 where ambient heating is turned on. The ambient heating can be resistance heaters positioned closed to the condenser coils to provide heat and prevent freezing.

In a step 760, a coil low-temp alarm is sent to the management system. The management system may be a building management system wherein the WSHP is installed. In response to the coil low-temp alarm, a person, e.g., a repairman, is typically sent to visually check the WSHP. The method ends in a step 770.

Figure 8:
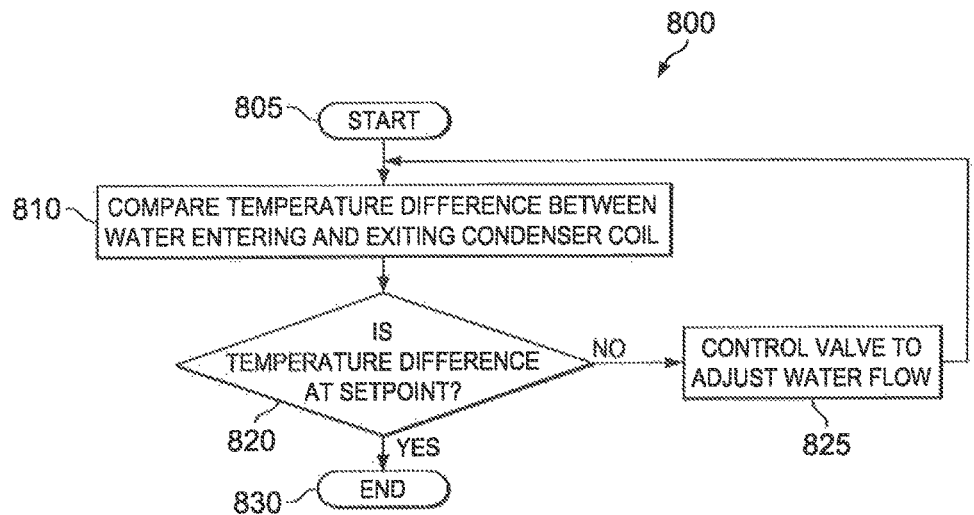
FIG. 8 illustrates a flow diagram of an embodiment of a method of providing automatic dynamic water flow control.

FIG. 8 illustrates a flow diagram of an embodiment of a method 800 of providing automatic dynamic water flow control. In method 800, a controller is employed to maintain a constant water temperature drop across the water cooled condenser. The valves 322 and 326 will be operated in PID loop to maintain delta-t close to a constant temperature drop (e.g., within a range of four degrees with this value being field adjustable) across the water cooled condenser coil by adjusting the water flow. The method 500 begins in a step 805.

In a step 810, a comparison is performed between water temperature entering and exiting the condenser coil. Conventional temperature sensors can be employed at the entrance and exit of the condenser coil to provide the temperatures for comparison for each refrigerant stage. A determination is then made in a decisional step 820 if the temperature difference is at the set point. The set point represents the target value plus the determined range. For example, with a total range of four degrees, and a set point of 15 delta-T, then measured value can be from 13 F to 17 F before the system will try to readjust the valve position. This is done to prevent the valves 322 and 326 and the pump system in the closed loop from trying to overcorrect for minor pressure fluctuations in head pressure. The range can be adjusted to better adapt the WSHP controller to the dynamics of a pump package. If the temperature difference is at the set point or within an acceptable range of the set point (one or two degrees, for example), then the method continues to step 830 and ends. If not at the set point or within an acceptable range, then the method continues to step 825 and the control valve is operated to adjust water flow through the condenser coils. The control valves, for example, are valves 322 and 326 in FIG. 3 and can be adjusted to control the amount of water flowing through the condenser coil. A higher water flow rate can lower the temperature difference wherein a lower water flow rate can increase the temperature difference.

Figure 9:
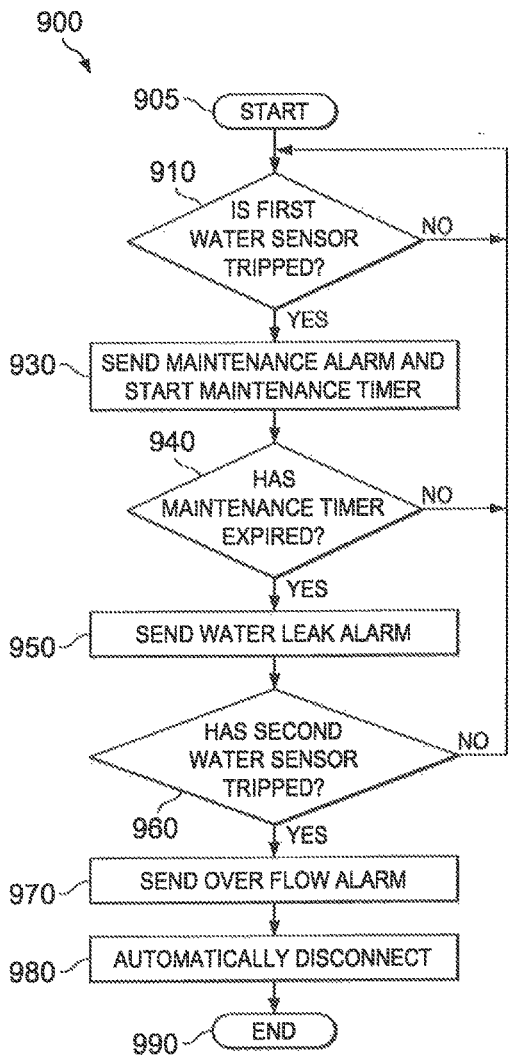
FIG. 9 illustrates a flow diagram of an embodiment of a method of providing leak detection.

FIG. 9 illustrates a flow diagram of an embodiment of a method 900 or providing water leak detection. The method 900 can be used with a drain pan having a recessed area. An example of such a drain pan 9 is illustrated in FIG. 17. The drain pan 9 is typically located under the water piping and condenser coils of the WSHP system. The drain pan 9 can be made from a metal or a plastic. The drain pan 9 includes a recessed area 10, an angled area 11 and two moisture sensors or float switches, 12 and 13. The first moisture sensor 12 is located in the recessed area 10 and the second moisture sensor 13 is located in the angled area 11. The drain pan 9 is configured to catch water or fluid. The angled area 11 is tilted such that water flows to the recessed area 10 when landing on the angled area 11. The recessed area 10 is configured to hold a minimal amount of water, e.g., a cup. Thus, the first sensor 12 can provide an early warning of a water leak. Both the first and second sensors 12, 13, are coupled to a controller, such as the controller 216, through either a wired or wireless connection. The sensors 12, 13, can be conventional moisture sensors and can be attached to the drain pan 9 in a conventional manner.

Turning back to FIG. 9, the method 900 begins in a step 905. A determination is then made in a first decisional step 910 if a first water (or moisture) sensor is tripped. If not, the method continues to step 910. If it is tripped, e.g., moisture is present in the recessed area 10, a maintenance alarm is sent to a management system and a maintenance timer is started.

A determination is then made in a second decisional step 940 if the maintenance timer has expired. The time set for the maintenance timer is five hours minutes in one embodiment. The amount of time set on the maintenance timer can vary depending on the installation or selected maintenance procedures. If the maintenance timer has not expired, then the method continues to step 910. If the maintenance timer has expired, then the method 900 continues to step 950 and a water leak alarm is sent to the management system.

A determination is then made in a third decisional step if a second water sensor has tripped in a step 960. If not, then the method continues to step 910. If so, then overflow alarm is sent to the management system in a step 970. The method 900 then continues to step 980 where the WSHP is automatically disconnected from the water system of the building. For automatic disconnection, a control signal can be sent to three way valves, such as valves 308 and 334 of FIG. 3, to disconnect the WSHP from the building water. In some embodiments, the three way valves are spring loaded and automatically disconnect from the building water when power is lost to the WSHP.

Figure 10:
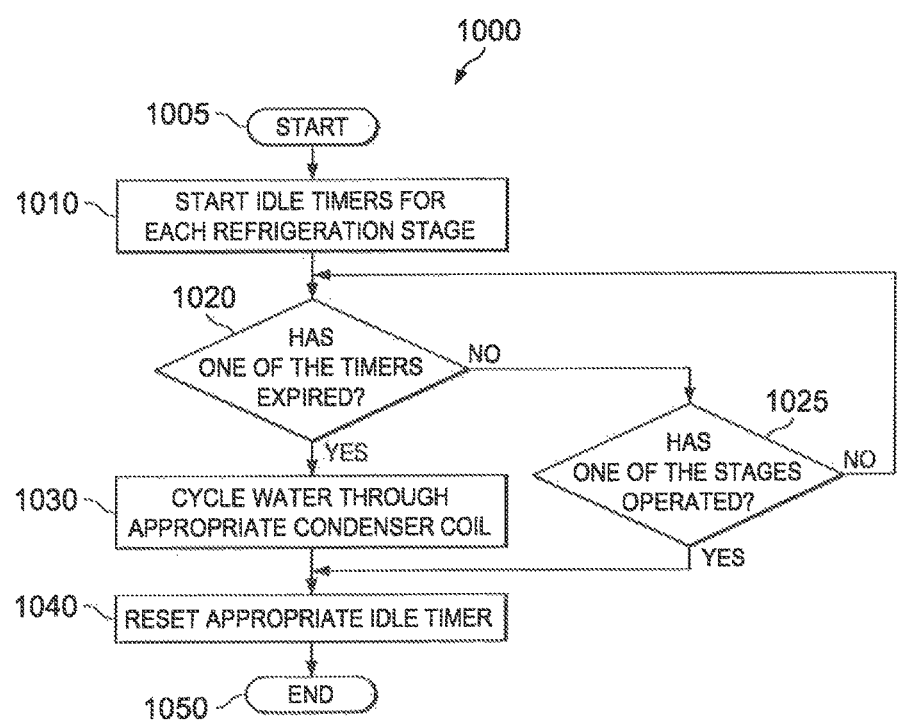
FIG. 10 illustrates a flow diagram of an embodiment of a method of providing an automatic condenser anti-corrosion flush.

FIG. 10 illustrates a flow diagram of an embodiment of a method 1000 of providing an automatic condenser anti-corrosion flush. The method 1000 opens and closes at timed intervals to prevent corrosion and scaling associated with long-term standing water. In one embodiment, a modulating actuator controlling an adjustable ball-valve, such as valve 322, 326, in FIG. 3, is employed. A WSHP can have multiple refrigeration stages wherein some of the stages are not operated on a regular basis. As such, the method 1000 moves water through the condenser coils of the different stages to prevent corrosion and/or scaling that can occur due to inactivity. The method 1000 begins in a step 1005.

In a step 1010, idle timers are started for each refrigeration stage of the WSHP. Thus, if there are four refrigeration stages, then four timers are started wherein each stage has their own timer. The amount of time on each timer can be the same or, in some embodiments, can differ based on expected or historical use.

In a step 1020, a determination is made in a first decisional step if a timer has expired. If so, the method continues to step 1030 and cycles water through the corresponding condenser coil of the expired timer. The water can be cycled through the condenser for a set amount of time. In one embodiment, the amount of time is one minute. The expired timer is then reset in step 1040. Typically, the expired timer is set to its original value. The method 1000 then ends in step 1050.

Returning now to step 1020, if a timer has not expired, a determination is then made in a second decisional step 1025 if one of the refrigeration stages has operated. If so, the method continues to step 1040 and the timer for the operated stage is reset. If not the method 1000 continues to step 1020.

Figure 11:
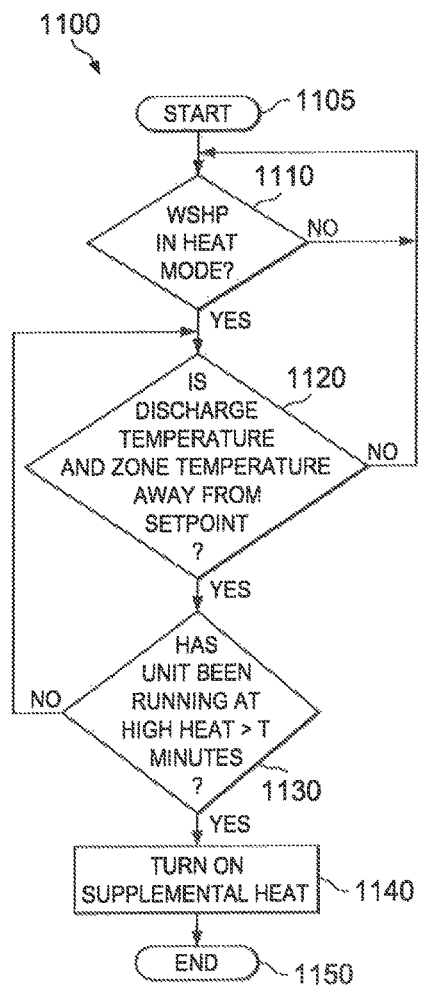
FIG. 11 illustrates a flow diagram of an embodiment of a method of providing supplemental heat.

FIG. 11 illustrates a flow diagram of an embodiment of a method 1100 of providing supplemental heat. The method 1100 can automatically bring in supplemental heat when the WSHP is unable to satisfy a building's heating load and/or supply emergency heat. When the WSHP unit enters emergency heat mode, a signal can be issued to a management system to alert maintenance of a lack of heating capacity. The alert can be toggled on or off at the controller. Supplemental heat can be delivered with either electric resistance elements or a gas-fired combustion heat exchanger. The method 1100 begins in a step 1105.

In a step 1110, a determination is made if the WSHP is in heat mode. If not the method continues to step 1110. If so, the method continues to step 1120 where a determination is made on how many degrees difference there is between the thermostat set point in the occupied space the WSHP is heating and the actual measured temperature in the occupied space. Default value is 5 F difference between setpoint and actual temperature, which is a value that is field adjustable.

If not the method continues to step 1110. If so, a determination is made in a third decisional step if the WSHP has been running at high heat more than a predetermined number of minutes T. In one embodiment, T is 60 minutes. If not, the method continues to step 1120. If so, the method continues to step 1140 where the supplemental heat is turned-on. The method 1100 then ends in a step 1150.

Figure 12:
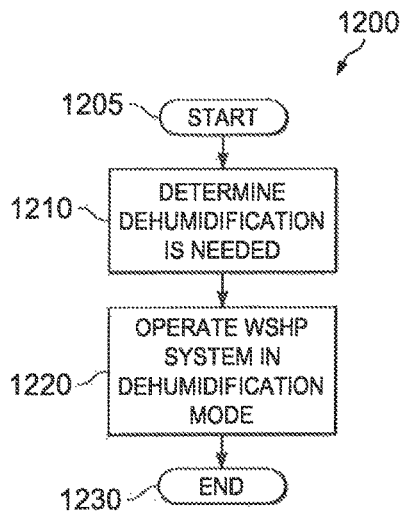
FIG. 12 illustrates a flow diagram of an embodiment of a method that provides dehumidification for a WSHP.

FIG. 12 illustrates a flow diagram of an embodiment of a method 1200 that provides dehumidification for a WSHP. The method 1200 allows the WSHP to dehumidify while heating or cooling by utilizing a row split indoor coil and a water cooled condenser coil. As such, the WSHP becomes a dual purpose unit with reheat and heat pump capabilities in the same unit. The method 1200 begins in a step 1200 when a determination is made that dehumidification is needed.

In a step 1210, a determination is made that dehumidification is needed. The determination can be based on humidity sensors located in the building. Conventional humidity sensors can be employed.

In a step 1220, the WSHP is operated in dehumidification mode wherein stage 1 is operated in a cooling mode and stage 2 is operated in a heating mode. Thus, in contrast to a heating mode wherein both of the stages would be operating in heating mode, the valve (e.g., valve 232 in FIG. 2) for stage 1 is reversed. Thus, air is reheated to allow cooling to remove humidity. The various sensors or controls needed to determine that dehumidification is needed and to manage the dehumidification can be the same ones used for humidity control described in the patents that are referenced above. The method ends in a step 1220.

Figure 13:
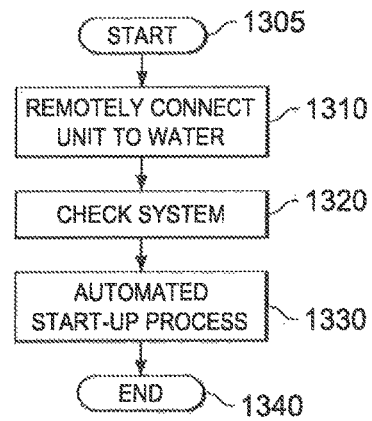
FIG. 13 illustrates a flow diagram of an embodiment of a method of providing remote connection from the building water system.

FIG. 13 illustrates a flow diagram of an embodiment of a method 1300 of providing remote connection from the building water system. Similarly, the method 1300 can be used to disconnect the WSHP from the building water system. Wireless or wired connections can be employed to connect a WSHP to a management system such as a building management system at an installation. The method 1300 begins in a step 1305.

In a step 1310, the WSHP is remotely connected to the building's water system. Three way valves, such as valves 308, 334 in FIG. 3 can be controlled remotely to provide the connection. As such, water from the building enters the water manifold of the WSHP. In a step 1320, the WSHP system is checked. Various sensors, such as moisture sensors 12 and 13 mentioned above, are used to determine if there are any leaks. A command can be sent to the management system indicating that there are no leaks. After checking the WSHP system, an automated start-up process begins in step 1330. The controller goes through a pre-programmed process, checks operation of all or at least most of the components and modes of the WSHP. The controller checks, for example, sensors, economizer, compressors, reversing Valves, blowers, water delta-T, pressure's etc. The controller can then send a report through a connection to the management system or another desired location. Additionally, the report can be loaded to a USB. The method then ends in a step 1340.

Figure 14:
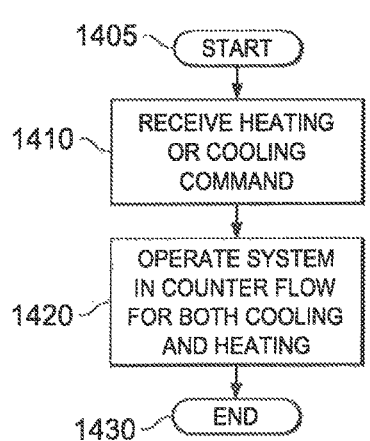
FIG. 14 illustrates a flow diagram of an embodiment of a method of providing a high efficiency counter-flow heating mode.

FIG. 14 illustrates a flow diagram of an embodiment of a method 1400 of providing a high efficiency counter-flow heating mode. The WSHP is capable of reversing water flow in a heating mode to maximize heat transfer in cooling and in heating by employing counter-flow for the heating cycle, also. Typically, a WSHP is optimized to provide the highest efficiency (counter-flow) in the cooling mode when hot discharge gas from the compressor enters the leaving water side of the coaxial water cooled condenser/heat exchanger. This improves heat transfer by maintaining a large temperature difference between the water and the refrigerant. Unfortunately, when the system switches to heating mode the heat transfer suffers because we loose the counter-flow heat transfer benefit. Method 1400 allows one of the two heat transfer fluids to be reversed in the coaxial heat-exchanger during the heating mode, increasing the efficiency of the system. The method 1400 begins in a step 1405.

In a step 1410, a heating or cooling command is received. The heating and cooling commands can be conventional HVAC commands received by a controller that are used to indicate a need for cooling or heating in an enclosed space (e.g., building).

In step 1420, the WSHP system is operated as a counter-flow heat transfer system for both cooling and heating. As such, in one embodiment the controller sends a signal to reverse the flow of water through the heat exchanger for a heating cycle. Accordingly, instead of having a parallel-flow heat transfer system that is typically employed for heat cycles, the flow of water is reversed for the heating cycle to provide a counter-flow heat transfer system. The flow of the refrigerant at the compressor is not altered with respect to conventional operation of a heat pump. Instead, in this embodiment the flow of water (also referred herein as the fluid) in the condenser coil is reversed in heating mode to provide counter-flow heat transfer. In this embodiment, the flow of water is not changed in a cooling mode since the water and refrigerant typically flow in an opposite direction for a counter-flow heat transfer. Controllable valves such as the three-way valves in FIG. 3 can be controlled by the controller to obtain counter-flow heat transfer for heating and cooling modes. In other embodiments, the direction of refrigerant flow or the direction of water can be reversed for either the heating or cooling modes to achieve counter-flow heat transfer. In either of the embodiments, the controller can send a control signal to manipulate the opening and closing of valves to control the directions of flow. The method 1400 ends in a step 1430.

Figure 15:
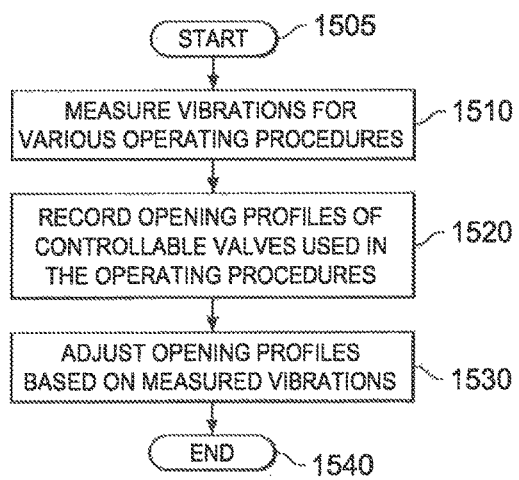
FIG. 15 illustrates a flow diagram of an embodiment of a method of providing an automatic anti-water hammer feature.

FIG. 15 illustrates a flow diagram of an embodiment of a method 1500 of providing an automatic anti-water hammer feature. The method 1500 can be used with the WSHP or with other HVAC or water systems that can suffer from water hammering. An accelerometer can be employed for the method 1500. Additionally, a fully modulating actuator controlling an adjustable ball-valve, such as illustrated in FIG. 3, can be used to adjust water flow and reduce or prevent water hammer. In some embodiments, a 0-10 volt signal can be sent to the actuator to adjust the opening or closing profile of a valve during various operations. Ecto adjustable parameters can be used to adjust opening and closing profiles. The accelerometer can be used to report vibrations during different operations and the controller can store these values and make adjustments to valve opening based thereon to reduce the vibrations. Successful adjustments can be stored and used again. The method 1500, therefore, can prevent or reduce the possibility of braze-plate heat exchangers from freezing at unit start-up and RTUs from high-head pressure at the start of the cooling cycle. The method 1500 allows for customization to the opening/closing profile/timing to eliminate water hammer effects on system piping. The method 1500 can be used with the WSHP or with other HVAC or water systems that can suffer from water hammering.

The method 1500 begins in a step 1505. In a step 1510, vibrations are measured and recorded for various operating procedures of a water system. The water system can be a WSHP, another type of HVAC system or a plumbing system having pipes for water or fluid to flow therethrough. The vibration measurements are matched with the particular operations which can include opening or closing valves for start-up cycles, cooling cycles, heating cycles, flushing cycles, etc. An accelerometer or multiple accelerometers can be employed to provide the vibration measurements to the controller.

Record opening profile of controllable valves used in the various operating procedures in a step 1520. In one embodiment the controller notes the how quickly or how slow a valve is opened for the various procedures and/or the amount in which the valves are opened. The operating speed and amount of opening can be controlled by varying the voltage of a control signal sent to the various controllable valves.

In a step 1530, the opening profiles of valves are adjusted based on the measured vibrations. A predetermined vibration level can be used to compare the vibration measurements to and adjustments can be made to the opening profiles when the measure vibrations exceed the vibration thresholds. As such, water hammer can be prevented or at least reduced. The method 1500 can be performed once during initial setup at an installation or can be performed throughout operation of a water system to make adjustments when necessary. The method 1500 ends in a step 1540.

Figure 16:
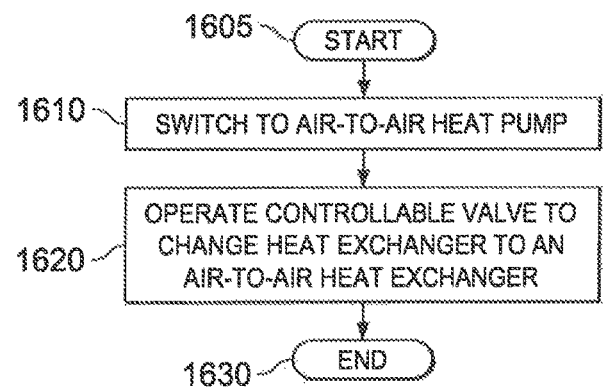
FIG. 16 illustrates a flow diagram of an embodiment of a method of switching between air-to-air and air-to-water WSHP systems.
Figure 18:
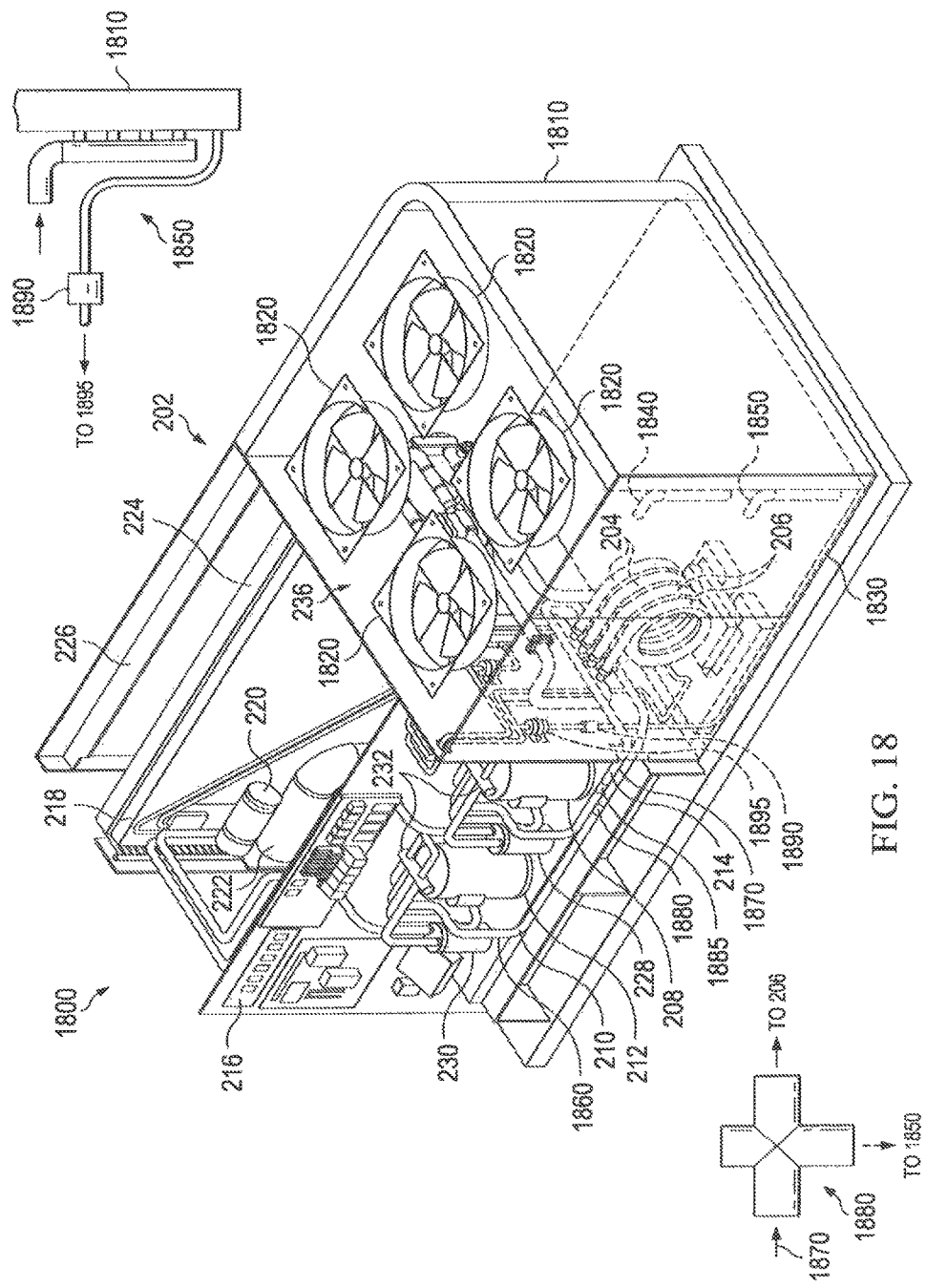
FIG. 18 illustrates a diagram of an embodiment of a heat pump having an air-to-air heat exchanger and an air-to-water heat exchanger constructed according to the principles of the disclosure.

FIG. 16 illustrates a flow diagram of an embodiment of a method 1600 of switching between air-to-air and air-to-water WSHP systems. The method 1600 is used with a heat pump that has both an air-to-air system and an air-to-water system. FIG. 18 illustrates such a system that includes both an air-to-air coil and condenser coils. A controller can be configured to switch to the conventional air-to-air heat pump if there are any problems with the WSHP. A controllable three-way valve can be used to select which heat exchanger to use. The method begins in a step 1605.

In a step 1610, a determination is made to switch to an air-to-air heat pump. The determination can be based on alarms or warning signals received at the controller with respect to the WSHP. The alarms or warning signals include, water leaks, vibration problems, etc.

In a step 1620, a controllable valve is operated to change the heat exchanger from a WSHP to a heat exchanger of an air-to-air heat pump. A controller may direct the operation of a controllable valve to make the switch. The method 1600 ends in a step 1630. On skilled in the art will understand the controller can also operate the controllable valve to switch back from air-to-air to air-to-water heat pump.

Turning now to FIG. 18, the hybrid air-to-air and air-to-water heat pump 1800 includes similar components to the WSHP 200 of FIG. 2 and are denoted the same. Additionally, the hybrid heat pump 1800 includes an air condenser coil 1810, condenser fans and a hinged access panel 1830. Each of these components may be conventional components.

Additionally, the hybrid heat pump 1800 includes a discharge manifold for stage 1 1850 and a discharge manifold for stage 2 1840 that are coupled to the air cooled condenser coil 1810. A discharge refrigerant stream from compressor stage 1 1870 and a discharge refrigerant stream from compressor stage 2 1860 are also noted in FIG. 18. A 3-way valve 1880 is positioned to allow hot discharge refrigerant stream 1870 coming from stage 1 compressor to be routed either to stage-1 water cooled condenser 206 or stage 1 air cooled condenser manifold 1850. A blow-up of the 3-way valve 1880 is provided that indicates the two different modes of employing the water cooled condenser 206 (mode 1) or the air cooled condenser 1850 (mode 2). When hot refrigerant bypasses the water cooled condenser 206 and is admitted instead into the air cooled condenser coil 1810, condenser fans 1820 are operated to draw outdoor air through the condenser coil 1810 and condense the liquid refrigerant. The liquid refrigerant exits the air-cooled condenser 1810 and re-enters the refrigeration system of the WSHP through a one-way check-valve 1890 that is installed up-stream of the liquid filter drier 1895. By changing the position of the 3-way valve 1880 the WSHP can select which condenser to use, either a water cooled condenser 206 (or 204 for second stage) or the air-cooled condenser 1810. The controller as disclosed herein can operate the 3-way valve 1880 according to the method 1600 to switch between modes 1 and 2.

In this example we have identified one such stage of refrigerant, additional refrigerant discharge streams like 1870 from stage 2 compressor would need another 3-way valve like 1880 connected to discharge manifold 1840. As such 3-way valve 1885 is also identified in FIG. 18 in the discharge stream 1860. An additional one way check valve can also be employed such as with check valve 1890 with stage 1. Each of the 3-way valves 1880, 1885, allow either fluid in the condenser coils 204, 206, or refrigerant in the compressors for stages 1 and 2, giving the WSHP unit the ability to switch between the different types of heat exchangers. One skilled in the art will understand, the piping between the various connections that are not illustrated.

In this embodiment we have described the unit operating in cooling mode where hot gas is sent to condenser coils(s), the unit will work equally as well in the heating mode when reversing valves 232 are used to send compressor hot gas to indoor coil of WSHP and the condenser coil extracts heat from either water entering the condenser coils 206/204 or coil 1810.

The above-described methods may be embodied in or performed by various conventional digital data processors, microprocessors or computing devices, wherein these devices are programmed or store executable programs of sequences of software instructions to perform one or more of the steps of the methods, e.g., steps of the methods of FIGS. 5-16. The software instructions of such programs may be encoded in machine-executable form on conventional digital data storage media that is non-transitory, e.g., magnetic or optical disks, random-access memory (RAM), magnetic hard disks, flash memories, and/or read-only memory (ROM), to enable various types of digital data processors or computing devices to perform one, multiple or all of the steps of one or more of the above-described methods, e.g., one or more of the steps of the methods of FIGS. 5-16. Additionally, an apparatus, such as dedicated WSHP controller or an RTU controller, may be designed to include the necessary circuitry or programming to perform each step of the methods of FIGS. 5-16 and include a memory to store the necessary operating instructions.

Those skilled in the art to which this application relates will appreciate that other and further additions, deletions, substitutions and modifications may be made to the described embodiments.

What is claimed is:
1. A water system, comprising:
  a compressor;

a condenser fluidly coupled to the compressor by refrigerant tubing;
a modulating motor-controlled valve configured to alter a flow of water through the condenser;
an accelerometer mechanically coupled to the water system, the accelerometer configured to monitor vibrational measurements; and
a water system controller configured to perform an automated anti-water hammer procedure wherein, during the automated anti-water hammer procedure, the water system controller is configured to:
activate an operating procedure for the water system, wherein the operating procedure comprises an opening position and an opening speed of the modulating motor-controlled valve;
transmit a control signal to the modulating motor-controlled valve, the control signal configured to open the modulating motor-controlled valve to the opening position at the opening speed;
receive, from the accelerometer, vibrational measurements measured by the accelerometer in response to opening the modulating motor-controlled valve to the opening position at the opening speed;
compare the vibrational measurements measured by the accelerometer to a predetermined vibration level associated with the operating procedure; and
adjust the opening position and opening speed of the modulating motor-controlled valve for the operating procedure if the vibrational measurements measured by the accelerometer exceed the predetermined vibration level associated with the operating procedure.

2. The water system as recited in claim 1, wherein the operating procedure is selected from the group consisting of a start-up cycle, a cooling cycle, a heating cycle, and a flushing cycle.

3. The water system as recited in claim 1, wherein the operating procedure for the water system further comprises a closing speed of the modulating motor-controlled valve and the water system controller is further configured to:
transmit a second control signal to the modulating motor controlled valve, the second control signal configured to close the modulating motor-controlled valve at the closing speed;
receive, from the accelerometer, additional vibrational measurements measured by the accelerometer in response to closing the modulating motor-controlled valve at the closing speed;
compare the additional vibrational measurements measured by the accelerometer to the predetermined vibration level associated with the operating procedure; and
adjust the closing speed of the modulating motor-controlled valve for the operating procedure if the additional vibrational measurements measured by the accelerometer exceed the predetermined vibration level associated with the operating procedure.

4. The water system as recited in claim 1, wherein the water system controller is configured to perform the automated anti-water hammer procedure once during an initial setup of the water system.

5. The water system as recited in claim 1, wherein the water system controller is configured to perform the automated anti-hammer procedure throughout operation of the water system.

6. The water system as recited in claim 1, wherein the water system controller is configured to prevent high head pressure at the start of a cooling cycle by adjusting the operating procedure.

7. The water system as recited in claim 1 further comprising a second modulating motor-controlled valve configured to be controlled by the water system controller.

8. A controller for a water system, comprising:
a memory configured to store an operating procedure for the water system;
a processor communicatively coupled to the memory, the processor configured to perform an automated anti-water hammer procedure wherein, during the automated anti-water hammer procedure, the water system controller is configured to:
activate the operating procedure for the water system, wherein the operating procedure comprises an opening position and an opening speed of a modulating motor-controlled valve;
an interface communicatively coupled to the processor, the interface configured to:
transmit a control signal to the modulating motor-controlled valve, the control signal configured to open the modulating motor-controlled valve to the opening position at the opening speed;
receive, from an accelerometer mechanically coupled to the water system, vibrational measurements measured by the accelerometer in response to opening the modulating motor-controlled valve to the opening position at the opening speed; and
the processor further configured to:
compare the vibrational measurements received from the accelerometer, to a predetermined vibration level associated with the operating procedure; and
adjust the opening position and opening speed of the modulating motor-controlled valve for the operating procedure if the vibrational measurements received from the accelerometer exceed the predetermined vibration level associated with the operating procedure.

9. The controller as recited in claim 8, wherein the operating procedure is selected from the group consisting of a start-up cycle, a cooling cycle, a heating cycle, and a flushing cycle.

10. The controller as recited in claim 8, wherein the operating procedure for the water system further comprises a closing speed of the modulating motor-controlled valve and the interface is further configured to:
transmit a second control signal to the modulating motor controlled valve, the second control signal configured to close the modulating motor-controlled valve at the closing speed;
receive, from the accelerometer, additional vibrational measurements measured by the accelerometer in response to closing the modulating motor-controlled valve at the closing speed; and
the processor is further configured to:
compare the additional vibrational measurements received from the accelerometer to a predetermined vibration level associated with the operating procedure; and
adjust the closing speed of the modulating motor-controlled valve for the operating procedure if the additional vibrational measurements measured by the accelerometer exceed the predetermined vibration level associated with the operating procedure.

11. The controller as recited in claim 8, wherein the controller is configured to perform the automated anti-water hammer procedure once during an initial setup of the water system.

12. The controller as recited in claim 8, wherein the controller is configured to perform the automated anti-water hammer procedure throughout operation of the water system.

13. The controller as recited in claim 8, wherein the controller is configured to prevent high head pressure at the start of a cooling cycle by adjusting the operating procedure.

14. The controller as recited in claim 8 further comprising a second modulating motor-controlled valve configured to be operated by the controller.

15. A computer-usable medium having non-transitory computer readable instructions stored thereon for execution by a processor to perform an automated anti-hammer procedure, the automated anti-hammer procedure comprising:
   activating an operating procedure for a water system, wherein the operating procedure comprises an opening position and an opening speed of a modulating motor-controlled valve of the water system;
   transmitting a control signal to the modulating motor-controlled valve, the control signal configured to open the modulating motor-controlled valve to the opening position at the opening speed;
   receiving, from an accelerometer mechanically coupled to the water system, vibrational measurements measured by the accelerometer in response to opening the modulating motor-controlled valve to the opening position at the opening speed;
   comparing the vibrational measurements received from the accelerometer to a predetermined vibration level associated with the operating procedure; and
   adjusting the opening position and opening speed of the modulating motor-controlled valve for the operating procedure if the vibrational measurements measured by the accelerometer exceed the predetermined vibration level associated with the operating procedure.

16. The computer-usable medium as recited in claim 15, wherein the operating procedure is selected from the group consisting of a start-up cycle, a cooling cycle, a heating cycle, and a flushing cycle.

17. The computer-usable medium as recited in claim 15, wherein the operating procedure for the water system further comprises a closing speed of the modulating motor-controlled valve and the automated anti-hammer procedure further comprises:
   transmitting a second control signal to the modulating motor-controlled valve, the second control signal configured to close the modulating motor-controlled valve at the closing speed;
   receiving, from the accelerometer, additional vibrational measurements measured by the accelerometer;
   comparing the additional vibrational measurements received from the accelerometer to a predetermined vibration level associated with the operating procedure; and
   adjusting the closing speed of the modulating motor-controlled valve for the operating procedure if the additional vibrational measurements measured received from the accelerometer exceed the predetermined vibration level associated with the operating procedure.

18. The computer-usable medium as recited in claim 15, wherein the automated anti-water hammer procedure is performed once during an initial setup of the water system.

19. The computer-usable medium as recited in claim 15, wherein the automated anti-hammer procedure is performed throughout operation of the water system.

20. The computer-usable medium as recited in claim 15, wherein the operating procedure is part of a cooling cycle procedure and the processor prevents high head pressure at the start of the cooling cycle by performing the anti-hammer procedure.

* * * * *